United States Patent [19]

La Barge

[11] 4,270,361
[45] Jun. 2, 1981

[54] ENERGY MANAGEMENT CONTROLLER FOR CENTRIFUGAL WATER CHILLER

[76] Inventor: Michael A. La Barge, 3135 Bruce Dr., Fremont, Calif. 94538

[21] Appl. No.: 20,590

[22] Filed: Mar. 14, 1979

[51] Int. Cl.³ .................... G05D 23/32; F25B 41/04
[52] U.S. Cl. .................................. 62/158; 62/201; 62/211; 62/217; 62/230
[58] Field of Search ............... 62/158, 157, 185, 201, 62/208, 209, 210, 211, 217, 230, 228 C, 226, 231

[56] References Cited

U.S. PATENT DOCUMENTS

| | | | |
|---|---|---|---|
| 2,817,213 | 12/1957 | Miner | 62/209 |
| 3,003,331 | 10/1961 | Coburn et al. | 62/217 X |
| 3,103,107 | 9/1963 | Ehlke | 62/217 X |
| 3,380,262 | 4/1968 | Miner | 62/217 X |
| 3,609,989 | 10/1971 | Richardson | 62/217 X |
| 3,618,333 | 11/1971 | Pedersen et al. | 62/217 |
| 4,084,406 | 4/1978 | Brenneman | 62/211 |
| 4,152,902 | 5/1979 | Lush | 62/157 |

*Primary Examiner*—William E. Wayner
*Assistant Examiner*—Harry Tanner
*Attorney, Agent, or Firm*—Townsend and Townsend

[57] ABSTRACT

An automatic chiller control is disclosed for providing a temperature sensitive load limit compressor control on a cooling water system, such as is used in buildings for air conditioning. The controller operates across at least one motor driven compressor and operates to adjust the vane inlet to a typically centrifugal compressor. Control is provided in discrete steps responsive to changes in cooling water temperature as the water typically returns from a building. The control when operated in the automatic position starts the chiller at minimum possible power consumption. Increasing load or unload of the chiller is provided in incremental steps (for example 5% of full load) at preselected time intervals (for example 10 minutes) which are typically adjustable to any other desired time span. The control seeks the required motor power output without waste of power. Provision is made where the controller is operating the chiller at less than an efficient level (for example with vanes closed) to periodically shut the chiller down for an adjustable time as required. Options of overriding manual adjustment as well as manual adjustment only are included.

12 Claims, 3 Drawing Figures

CONNECTIONS TO CONTROLLER

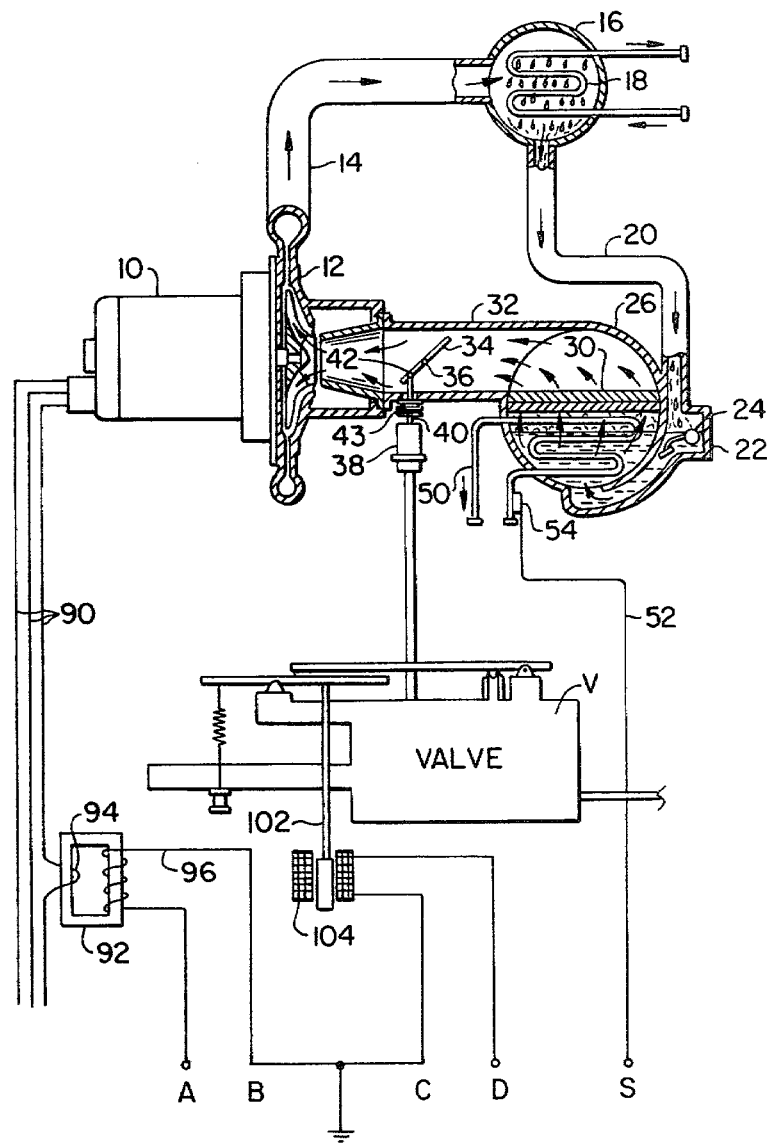
CONNECTIONS TO CONTROLLER
FIG.__1.

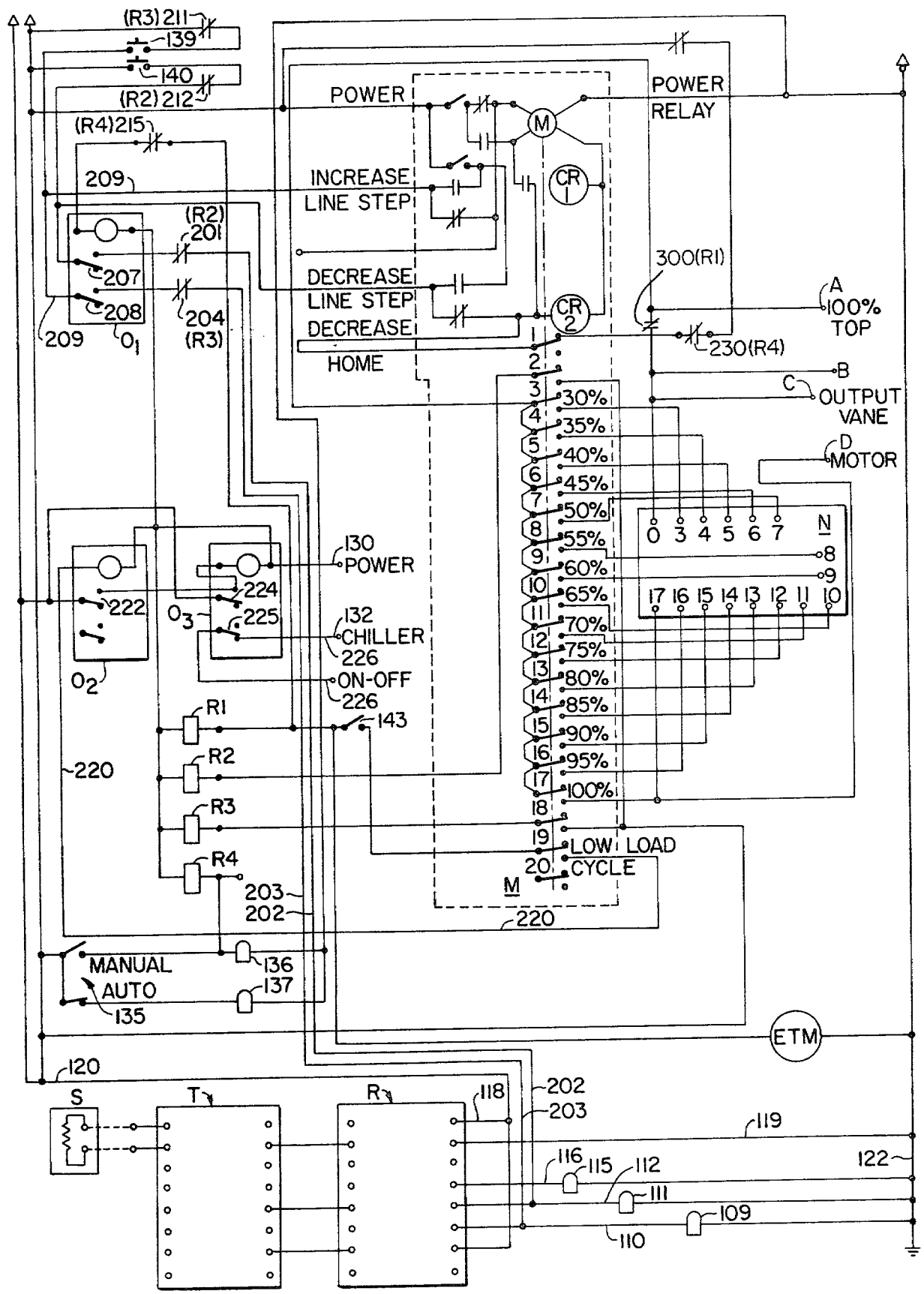
FIG._2.

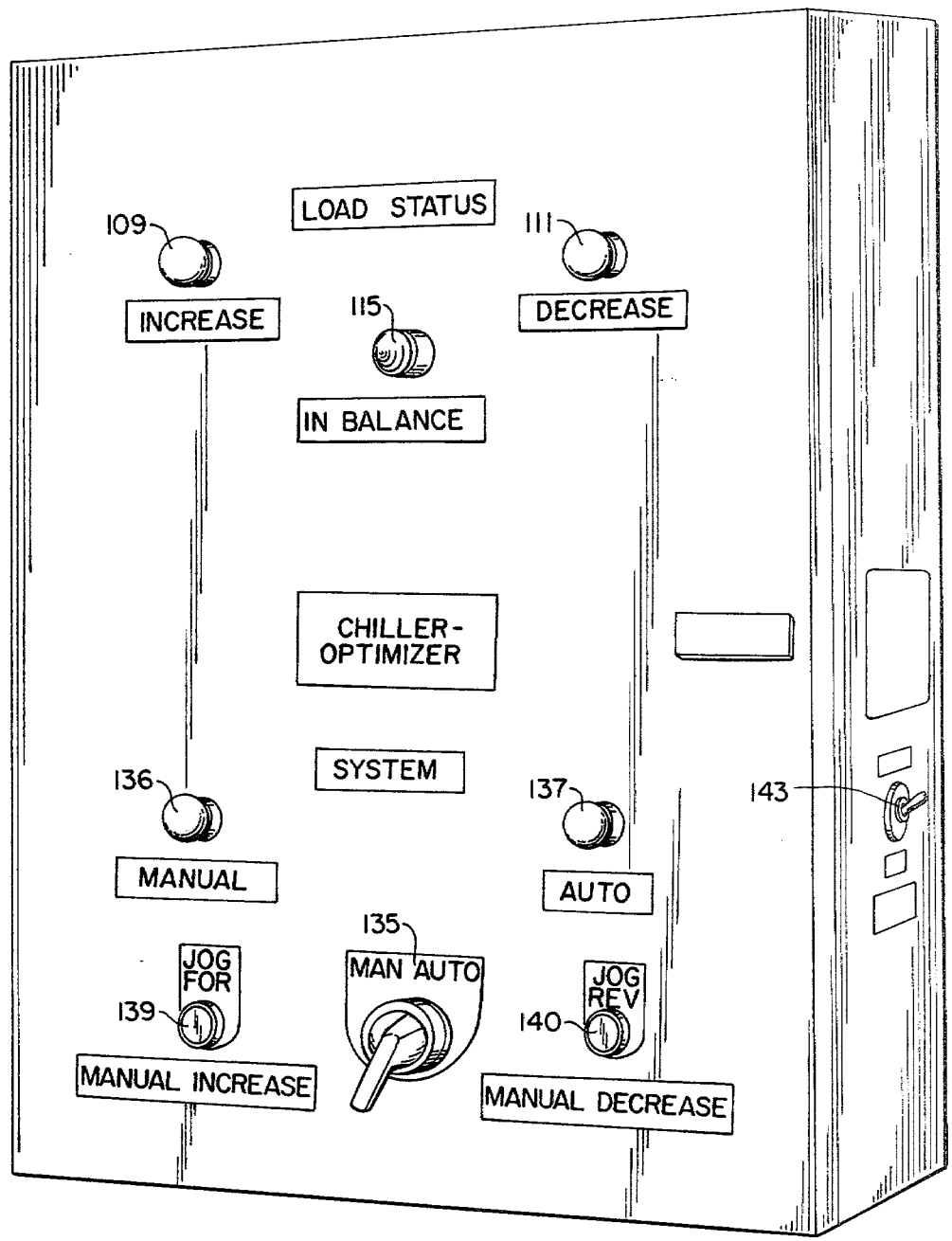
FIG._3.

ENERGY MANAGEMENT CONTROLLER FOR CENTRIFUGAL WATER CHILLER

SUMMARY OF THE PRIOR ART

In most large buildings, the compressor motor on the central air conditioning system is the largest single consumer of electrical energy. At present, most chillers are programmed to operate and control the air conditioning system by chilling water to a constant temperature to meet the air conditioning needs on the hottest day of the year. This arrangement has no regard for power used up from the start up of the chiller. Moreover, the colder the water is maintained leaving a chiller, the more energy cost is encountered. For example, approximately 2% less power is used for every degree the chilled water temperature is raised when it leaves a chiller.

Chiller controls that automatically adjust the chilled water temperature to meet the requirements of a cooling loop on a moment to moment basis greatly reduce the power consumption.

It is known to throttle the inlet to a chiller compressor with a vane type valve. It is further known to select percentages of power manually to limit the need of a motor. See R. G. Miner U.S. Pat. No. 2,817,213 of Dec. 24, 1957.

Additionally, in one prior art device, a full closing stroke of a pneumatically closed compressor vane is measured as to time. Throttling movement of the vane is provided by timed pulses of pressurized air. This type of throttling movement provides uncertainty both as to vane closure and as to the power setting.

In air conditioning systems, the power used is the best measurement of refrigeration provided. Using vane closure only as a measure of control can lead to the machine following an unrepeatable energy consumption pattern when coming on line. For example, and depending upon the startup thermodynamic balance of a building, pressure variations within the refrigerant cycle can be present with the vane valve set at a constant opening. Various power consumptions can of course depend upon the pressure differential across the vane, even though its setting remains constant.

Where a building shares predictable thermal loading from predictable exterior and interior heat load sources, it is preferable to have a predictable and repeatable time-based thermal pattern of air conditioning. This predictable time-based thermal pattern permits operating personnel to understand and locate the most efficient mode of operation. Unfortunately, the prior art attempts at relying on vane closure only to provide approximate power settings does not result in the predictable, retraceable thermal pattern needed for air conditioning control with the maximum possible efficiency.

SUMMARY OF THE INVENTION

An automatic chiller control is disclosed for providing a temperature sensitive load limit compressor control on a cooling water system, such as is used in buildings for air conditioning. The controller operates across at least one motor driven compressor and operates to adjust the vane inlet to a typically centrifugal compressor. Control is provided in discrete steps responsive to changes in cooling water temperature as the water typically returns from a building. The control when operated in the automatic position starts the chiller at minimum possible power consumption. Increasing load or unload of the chiller is provided in incremental steps (for example 5% of full load) at preselected time intervals (for example 10 minutes) which are typically adjustable to any other desired time span. The control seeks the required motor power output without waste of power. Provision is made where the controller is operating the chiller at less than an efficient level (for example with vanes closed) to periodically shut the chiller down for an adjustable time as required. Options of overriding manual adjustment as well as manual adjustment only are included.

OTHER OBJECTS, ADVANTAGES AND FEATURES

An object of this invention is to disclose an apparatus and process of automated chiller start up. According to this aspect of the invention, the chillers will always be started at the minimum possible efficient power level to keep from establishing initial high level demands. The controller will then cause the machine to be incrementally loaded or unloaded in the preselected percentile steps of compressor current draw on a timed interval. By stepping in preselected steps (in the order of 5%) for set timed intervals (say in the order of 10 minutes), the unit will keep from overshooting the load. This will allow time for return water to pass through the building to see if sufficient cooling is provided through the power setting then generated.

An advantage of the controller disclosed is that predictable and precisely repeatable chiller start-up patterns can be achieved. Building operating personnel can repeatedly set the disclosed controller for most efficient operation. Moreover, the controller can be customized to a wide variety of air conditioning designs and conform to all air conditioning lags found in the field.

An advantage of this aspect of the invention is that if the building can be satisfied with a higher water temperature, the disclosed process will automatically set the water temperature in direct response to the building requirement without effecting comfort. Savings in the order of 20% have been realized.

An advantage of the disclosed controller is that it is readily adaptable to existent systems. For example, a pneumatic system such as that offered by the Trane Company of La Crosse, Wisc. can be adapted to the disclosed controller.

A further advantage of the disclosed apparatus and process is that standard safety devices and controls are not effected by the installation of the control.

Yet another advantage of the invention is that it readily includes standard indicator lights. These lights show modes of operation at all times.

A further advantage of the apparatus and process disclosed is that temperature and timer adjustments can be made by operation personnel interior of the unit.

Yet another advantage of the apparatus and process is that the controller eliminates electrical surges due to rising condenser pressures, pneumatic pressure fluctuation and rapid chilled water changes.

Yet another advantage of this invention is that the controller is provided with a manual limitation. The operator of the controller can limit the power draw of the motor by manually manipulating a switch.

Another object of this invention is to disclose in combination with the incrementally stepped controller of this invention, an adjustable low load off cycle. According to this aspect of the invention and where the chiller has operated at a below efficient level, provision is made for the periodic shutdown of the chiller. During this time, the existent loop in the building can provide for cooling. Periodic return of the chiller to the line is made to maintain the line in a cooled state.

An advantage of this aspect of the invention is that chiller operation at below efficient level is never called for over extended time periods. Instead, the heat reservoir of the loop in the building can be relied on for periods of time to provide the needed cooling effect.

An advantage of the low load off cycle of this invention is that it can be bypassed. Where shutdown is not desirable—as in critical air conditioning locations such as computer rooms and the like—the low load cycle can be taken off by moving the load by a simple movement of a switch.

Other objects, features and advantages of this invention will become more apparent after referring to the following specification and attached drawings in which:

FIG. 1 is a schematic view of a prior art chiller with the load limit connections shown;

FIG. 2 is a schematic electrical diagram of the chiller control of this invention illustrating chiller operation; and FIG. 3 is a view of the exterior of the chiller cabinet illustrating the external indicators for operation of the unit.

Referring to FIG. 1, it will be emphasized that FIG. 1 is adapted from FIG. 1 of R. G. Miner U.S. Pat. No. 2,817,213 issued Dec. 24, 1957.

An electric motor 10 is connected to and drives a compressor 12. The compressor 12 discharges a refrigerant gas into a pipe 14 which conducts the gas to a condenser 16. The condenser is preferably of the shell and tube type which is cooling water flowing through the tubes 18 and the refrigerant is in the shell outside the tubes. The refrigerant liquid is condensed in the condenser 16 and flows by gravity through pipe 20 to a float chamber 22. A float in the chamber 22 opens and closes control of the flow of refrigerant to evaporator 26. Evaporator 26 is preferably of the shell and tube type in which a secondary refrigerant liquid such as water or brine flows through the tube 28. In removing heat from the secondary refrigerant, the refrigerant in the evaporator 26 boils forming gas which passes through and in the liquid eliminator 30 and then into the suction pipe 32 to compressor 12.

A vane type valve 34 is mounted at pivot 36 in and the suction pipe 32 of compressor 13. Butterfly or damper valve 32 may be pivoted from a position of varying blockage to reduce the flow of the gas to the compressor 12. It will be understood that other means other than the dampers shown here may be used to vary the flow to the compressor.

It is known that the rate of gas flow through the compressor is one of the factors which determines the power required by the compressor and thus the current required by the motor. Other factors include pressure across the expansion portion of the cycle, overall building temperature and the like. Therefore, the position of the damper 34 is only a factor in determining the current drawn by the motor 10. Measurements of precise current drawn by the motor are the most reliable indication of chiller control.

A pneumatic motor 38 has a rod 40 pivotally connected to the vane 34 at 42. A bellows 43 provides a seal between the rod 40 and the pipe 32. Bellows 43 is flexible to permit movement of the rod 40. The pneumatic motor is of well-known construction in which the piston or diaphragm translates pressure into rod positions.

A pneumatic thermostat 4 is connected to receive air under pressure from a source 6. Thermostat 4 has a temperature sensing bulb 8 thermally responsive to the temperature of the fluid in the pipe 50 which conducts the secondary refrigerant to the refrigeration load. The bulb 8 is connected to the thermostat 4 by a tube 2.

A valve generally denominated as V is of the type disclosed in the Miner U.S. Pat. No. 2,817,213. This valve is of a well-known type to provide variable positioning to the vane 34 upon upward or downward movement of a solenoid 102.

The motor 10 is of the three-phase variety and is shown with three electrical leads 90 connected to a source of electrical energy. A current transformer 92 has its primary winding 94 in one of the leads 90. The secondary winding 96 provides two output terminals A, B, which connect to one side of the controller and related circuit of this invention.

Solenoid valve lever 102 is actuated by a solenoid 104. Solenoid 104 connects to terminals C, D of FIG. 2 of the controller and circuitry of this invention.

Finally, it is necessary to measure the temperature of water returning from the building in loop 50. This is measured by a temperature sensor 54 connected by line 52 to a medium sensor S. It is most advantageous to provide a sensor on the return loop to maintain the return water temperature at the highest temperature possible consistent with cooling comfort.

It will be realized by the reader, that the description thus far is illustrative of the prior art, with the exception of the interruption between transformer 92, solenoid 104 and the sensor S. The circuitry of FIG. 2 discloses the apparatus and process of this invention in providing the desired interconnections so that a predictable and retraceable machine hunting for the most efficient power setting occurs.

Referring to FIG. 2, medium sensor S is illustrated in the lower portion of the diagram and is a thermal sensor which typically connects to the building cooling loop 50. Preferably, connection is made to the return line, the object of this invention being to keep the return water at as high a temperature as possible to utilize as little energy as possible in producing the thermal differential in the chiller.

The medium sensor S has a connection to a standard thermostat. A thermostat such as the Barber Colman solid state two input controller thermostat Model No. CP-8102-0-1 can be used in a single input mode only and is generally denominated at T. Output of the thermostat occurs to a Barber Colman two stage model CC-8102-0-1 relay R. The Barber Colman Company is of Rockford, Ill.

Relay R puts out three respective signals. A first signal is emitted on line 110 when the temperature is higher than the set value of the thermostat. A second signal is emitted on line 112 when the temperature is below the set value of the thermostat. A final signal is emitted on line 116 when temperature is in balance and within the temperature differential set in the thermostat.

Power is supplied to the relay across line 120 on the high voltage side (typically 110 volts) and line 122 on the ground or common side. Respective inputs to the relay include input 118 from the high side and input 119 from common.

To indicate the state of what the unit requires, respective increase light 109, decrease light 111, and in balance light 115 are connected from relay R to ground 122. These corresponding lights are also illustrated in FIG. 3.

A microswitch controller M is connected to a transformer N.

The function of transformer N is to provide variable windings across the motor. Windings from a 30% level through and to 100% motor level in 5% incremental steps are shown and connected to the microswitch.

Single stepping microswitch M is a product of the Eagle Signal Controller Company of Davenport, Iowa. This particular controller is sold under the model designation MTA-240A6. Broadly, the single stepping controller provides a series of terminals and microswitches. The microswitches can be individually adjusted to each of 20 steps around the periphery.

Microswitches 1, 2, 3 and 19 are all closed (opposite the position illustrated) at the low power or initial on line position of the controller. Upon an initial rotation calling for an increase in the power setting, these switches all open, and in sequence microswitches 4–16 sequentially open. Finally, and with the unit at maximum power microswitches 17, 18 close.

Referring to the indicated microswitches, it will be seen that microswitch terminal 3 connects to winding 3 on the transformer. Microswitch 4 connects to corresponding transformer winding 4, etc.

The microswitch assembly comprises a rotating element that rotates in single steps closing the microswitches as previously indicated. With each successive incremental rotation, a different winding of transformer N is selected. The transformer windings are thus selected in increments. These increments here range from an initial setting at the 30% level to a full power setting at the 100% level. The increments are here shown in five percentile steps.

As will hereinafter be apparent, when the machine shuts down, it is desirable to return the microswitch M to the lowest power setting. Terminal 1 on microswitch M is utilized for that purpose. Likewise, when the unit is running at or near its 30% efficiency, microswitches 2 and 19 assist in causing the low load cycle to actuate. In this cycle, as will hereinafter be set forth, the controller shuts the chiller down for preselected periods of time.

Three conventional timers are utilized with the circuitry. A timer $0_1$ is the timer which selects the increment for the incremental stepping of the microswitch M. For example, timer $0_1$ could be set to a ten minute interval. It will allow the controller to keep the machine at the same power setting for 10 minutes. At the end of this period of time, the machine will examine relay R and determine whether increase, decrease or maintenance of the same power setting is required.

Timers $0_2$ and $0_3$ are used when running of the chiller is at a below efficient level. Timer $0_2$ functions to measure the total amount of time that the chiller runs at its lowest power setting. This timer is usually set at a level of twice the interval of timer $0_1$. For example, where a timer $0_1$ is set at the ten minute level, timer $0_2$ will time to see if operation at the lowest power setting occurs during an interval exceeding 20 minutes.

Timer $0_1$ is an impulse timer of the Eagle Signal Co. Model DG-109A603. Timer $0_2$ is Model No. DG-110A600 and Timer $0_3$ is Model No. DG-112A602. All timers are manufactured by Eagle Signal Co. of Davenport, Iowa.

Assuming that operation at the lowest power level occurs at an interval exceeding 20 minutes, timer $0_3$ will be activated. Timer $0_3$ connects to the main power to the chiller at terminal 130, 132. It will cause the chiller to be turned off for the set period of time. By way of example, timing in the off state for periods of an hour have been used.

A switch 135 (see FIGS. 2 and 3) is provided to select between the auto and manual modes of the controller. Indicator lights 136, 137 are used to indicate the respective manual and automatic mode called for (see FIGS. 2 and 3).

Finally, there is provided a series of manual override contacts 139, 140. These respective contacts enable the controller when set to the manual mode to be stepped by an operator bypassing the automatic delay of this invention.

Provision is made to connect and disconnect the low load cycle of this invention at a toggle 143 (see FIGS. 2 and 3).

Having described the major components of this invention, the operation will now be set forth assuming a start up.

Assuming the controller is set in the automatic position and the chiller turned on, as by a time clock or other apparatus not shown, microswitch M will be in the low load position.

Typically, power will be supplied to the controller through a time clock (not shown). This power will be applied across lines 120, 122. Assuming that switch 135 is in the auto position, and assuming further that chiller start up is called for, it will be remembered that the microswitch terminal M will be set for the lowest winding. This will be done by the tap wire closing mircoswitch M terminal #3. A 30% of rated power will pass out to the motor output at C and D. Correspondent adjustment of vane 34 will occur.

It will be noted that microswitch terminal 2 will be closed. This terminal will run through relay R2. Relay R2 will be energized and open contacts 201. When contacts 201 are open, further decrease signals to the signal controller N are inhibited even though sensor S may call for a further decrease in temperature.

Assuming that sensor S calls for an increase, there will appear an output on line 110. Indicator light 109 wll be in the illuminated position. An increase signal will pass out line 203 go through and pass through normally closed relay 204. Relay 204 is only opened upon closing of microswitch 18 on controller M. It inhibits switch rotation beyond the 100% power setting.

Time clock $0_1$ will function to close its relays 207, 208 at the end of every timed period (here a period of 10 minutes). At that time line 209 will pass to the Eagle Signal Controller M, a signal for increasing the load one step.

The motor will index one step, disconnecting transformer winding 3 and connecting transformer winding 4. The chiller will then run at 35% of capacity. Assuming that increases are still called for, they will continue at programmed ten minute intervals until relay R indicates at indicator 115 that the system is in balance by outputting a signal 116.

The function of the circuitry to effect stepping decreases is analogous. Typically, relay R will put out a signal on line 112 illuminating light 111 energizing line 202. At the appropriate interval, (that is once every ten minutes) relay 207 will close, calling for a decrease of the controller one step. Assuming that the motor was running at 25%, a return to the 30% winding will be effected.

Provision is made for manual bypass. Assuming that a decrease is desired, momentary contact 140 can be manually closed. The circuit will decrease the power setting one step. Similarly, depression of circuit momentary contact 139 will increase power one step.

When increase and decrease is produced in this manner with the switch remaining in the automatic position, it will be noted that the timers are connected. Hence the machine at its next interval will seek increase or decrease as indicated by the sensor S. Thus on start up in extremely hot weather, an operator can take the machine to a higher power setting manually rather than wait for the programmed start up from the low energy position.

Assuming, that the machine is operating at 100% and yet sensor S calls for additional power, further rotation of the microswitcher mechanism M must be inhibited. It will be seen that microswitch 18 from assembly M will energize relay R3. This relay will open contacts 211.

Likewise, if the machine is operating at its lowest level and a momentary contact 140 is depressed, relay 212 will open preventing further manual decrease.

Assuming that the unit is switched to the manual position, and manual control only is desired, relay R4 will be energized. Relay R4 will open contacts 215, which contacts will stop the operation of all timers. Thereafter, only manual operation will be called for.

Naturally, in the manual mode, light 136 will be illuminated indicating manual mode and light 137 extinguished.

Assuming that the sensor S is operating the chiller at a 30% level, and this temperature is enough to maintain the building unit in a cool condition, automatic shutdown of the machine is provided. Specifically, and if the low load cycle contact 143 is closed, microswitch 19 will be in the closed position on microswitch mechanism M. Line 220 will be energized and will commence running the respective timers $0_1$ and $0_2$.

Timer $0_2$ is typically set for a period twice that of timer $0_1$. Assuming that the chiller operates so that adequate cooling is supplied at sensor S to maintain the chiller running at a 30% level, at the end of the set time interval (20 minutes) contacts 222 will close. When this closure occurs, timer $0_3$ will be energized. Contacts 224, 225 will move. Contacts 224 will close and energize timer $0_3$. It will run for its set period of time before returning contact 224 to the set state.

At the same time, circuit 225 will open. This will place an interruption across line 226 which line will turn the chiller off. Conventional shorting across the vane motor is provided by relay switch 300 when power to relay R1 is interrupted.

Thus it can be seen, that where the chiller operates for the set interval at the lowest power setting periodic shutdown will be provided. Since the overall coolant condition of the building is calling for an inefficient load, the heat sink provided by the building loop will be utilized for air conditioning (if any is required). If at the end of the set period of shutdown the sensor S is in an increased state, the cycle will continue as previously indicated.

It will be appreciated that the disclosed system thus provides for a precisely predictable programmed "hunting" over discrete periods of time in a repeatable pattern of motor power settings. The controller can gradually bring a chiller on line and to only that power setting necessary for producing cooling to counterbalance internal and external thermal loads.

When shutdown of the machine occurs, and operation is other than at the lowest level, return of the microswitch to the lowest setting is automatically provided. Specifically, microswitch contact M1 will remain in the closed position. Assuming that manual operation is not called for, relay 230 will remain closed being energized from relay R4. Likewise, microswitch 1 will remain closed. Thus power will be continually provided to rotate the microswitch M until it reaches the lowest power setting. At this power setting, microswitches 1, 2 and 3 will move to the opposite position, at which time further rotation of the microswitch mechanism M will no longer occur and the unit will be ready for start up at the 30% level.

What is claimed is:

1. In the combination of a system for cooling including a loop for providing a flow of cooling fluid to a body to be cooled;

a heat exchanger for cooling said fluid supplied to said loop;

a compressor powered refrigeration cycle for cooling said exchanger having a flowing fluid for passing at least to an inlet from said exchanger to a compressor, a compressor outflow having thermal connection to a heat sink to dissipate heat from said loop and an inlet to said exchanger; and, means for throttling the inlet to said compressor to adjust the power required to operate said compressor, and a control for changing said means for throttling, the improvement in said control comprising:

means for measuring the power output of said compressor in precisely predetermined increments of the full power output of the full power rating of said compressor;

means for measuring the temperature of cooling fluid in said loop connected to said loop;

thermostat means for determining whether the temperature in said loop is above or below a selected level and emitting respective above or below signals, said thermostat means connected to said means for measuring temperature;

a first timer having a setting for a sequential timed interval for periodically communicating therethrough above and below signals from said thermostat means at the end of timed intervals;

circuit means operable through said timer at the end of each said interval to select from said means for measuring the power output a greater incremental power setting in response to said above signal and a lower power setting in response to a below signal in said means for measuring the power; and, means operably connected between said power measuring mens and said means for throttling the inlet to said compressor for restricting the flow of refrigerant fluid to said compressor to maintain the power of said compressor at the selected increment of full power.

2. The combination of claim 1 and wherein said means for measuring power output includes increments spaced at 5% the full power output of said compressor.

3. The invention of claim 1 and wherein said means for measuring the temperature of fluid in said loop is connected to the return to said loop to said heat exchanger.

4. The invention of claim 1 and wherein said timer has a continuously adjustable setting.

5. The invention of claim 1 and including second timer connected to one power setting for measuring the dwell time on said power setting and comparing that setting against a preset time interval; and third timer connected to said second timer for shutting said compressor down for a preselected period of time.

6. In the combination of a system for cooling including a loop for providing a flow of cooling fluid to a body to be cooled;
- a heat exchanger for cooling said fluid supplied to said loop;
- a compressor powered refrigeration cycle for cooling said exchanger having a flowing fluid for passing at least to an inlet from said exchanger to a compressor, a compressor outflow having thermal connection to a heat sink to dissipate heat from said loop and an inlet to said exchanger; and,
- means for throttling the inlet to said compressor to adjust the power required to operate said compressor;
- means for measuring the power output of said compressor in precisely predetermined increments of the full power output of the full power rating of said compressor;
- means for measuring the temperature of fluid in said loop connected to said loop;
- thermostat means for determining whether the temperature in said loop is above or below a selected level and emitting respective above or below signals, said thermostat means connected to said means for measuring temperature;
- a first timer having a setting for a sequential timed interval for periodically communicating therethrough above and below signals from said thermostat means at the end of timed intervals;
- circuit means operable through said timer at the end of each said interval to select from said means for measuring the power output a greater incremental power setting in response to said above signal and a lower power setting in response to a below signal in said means for measuring the power; and,
- means operably connected between said power measuring means and said means for throttling the inlet to said compressor for restricting the flow of refrigerant fluid to said compressor to maintain the power of said compressor at the selected increment of full power.

7. The combination of claim 6 and wherein said loop is closed.

8. The combination of claim 6 and wherein said compressor is powered by an electrical motor and said means for measuring the power output of said compressor includes means for measuring at least part of the current flow to said compressor.

9. The invention of claim 6 and including second timer connected to one power setting for measuring the dwell time on said power setting and comparing that setting against a preset time interval; and third timer connected to said second timer for shutting said compressor down for a preselected period of time.

10. In the combination of a system for cooling including a loop for providing a flow of cooling fluid to a body to be cooled;
- a heat exchanger for cooling said fluid supplied to said loop;
- a compressor powered refrigeration cycle for cooling said exchanger having a flowing fluid for passing at least to an inlet from said exchanger to a compressor, a compressor outflow having thermal connection to a heat sink to dissipate heat from said loop and an inlet to said exchanger; and,
- means for throttling the inlet to said compressor to adjust the power required to operate said compressor;
- means for measuring the power output of said compressor in precisely predetermined increments of the full power output of the full power rating of said compressor;
- means for measuring the temperature of fluid in said loop connected to said loop;
- thermostat means for determining whether the temperature in said loop is above or below a selected level and emitting respective above or below signals, said thermostat means connected to said means for measuring temperature;
- a first timer having a setting for a sequential timed interval for periodically communicating therethrough above and below signals from said thermostat means at the end of timed intervals;
- circuit means operable through said timer at the end of each said interval to select from said means for measuring the power output a greater incremental power setting in response to said above signal and a lower power setting in response to a below signal in said means for measuring the power;
- means operably connected between said power measuring means and said means for throttling the inlet to said compressor for restraining the flow of refrigerant fluid to said compressor to maintain the power of said compressor at the selected increment of full power;
- second timer means connected to the lowest power setting of said power measuring means for timing the interval at which said circuit means selects said lowest power setting; and
- compressor interrupting means to said compressor for stopping said motor for a predetermined period of time upon operation at said lowest power setting.

11. The invention of claim 10 and including second timer connected to one power setting for measuring the dwell time on said power setting and comparing that setting against a preset time interval; and third timer connected to said second timer for shutting said compressor down for a preselected period of time.

12. A process for controlling an electrically driven cooling system including the elements of a loop for providing flow of cooling fluid for a body to be cooled; a heat exchanger for cooling said liquid supplied to said loop; a compressor powered refrigeration cycle for cooling said exchanger having a flow fluid for passing at least to an inlet from said exchanger to a compressor; a compressor outflow having a thermal connection to a heat exhanger to dissipate heat from said loop and inlet to said exchanger; and means for throttling the inlet to said compressor to adjust the electrical power required to operate said compressor; said process for control including the steps of providing to one of the electrical leads to said compressor a transformer to measure in discrete steps the power being supplied to said compressor; measuring the temperature of fluid in the loop; comparing the measured temperature in said loop to a preselected level to determine whether the loop is above or below the selected level; providing a timer having a normally open connection to connect the output of said thermostat means periodically to said power measuring means; periodically closing said normally open connection to call for a greater measured incremental power setting in response to higher temperature than said selected level and a lower powered level in response to lower temperature than said selected level; and, throttling the inlet to said compressor to match the power setting selected.

* * * * *